March 14, 1967 W. GUIER 3,308,691

CLUTCH BETWEEN A SOURCE OF POWER AND A MEMBER TO BE ROTATED

Filed Sept. 29, 1965 2 Sheets-Sheet 1

INVENTOR.
WILLIAM GUIER

BY Arthur L. Wade

ATTORNEY

March 14, 1967 W. GUIER 3,308,691
CLUTCH BETWEEN A SOURCE OF POWER AND A MEMBER TO BE ROTATED
Filed Sept. 29, 1965 2 Sheets-Sheet 2
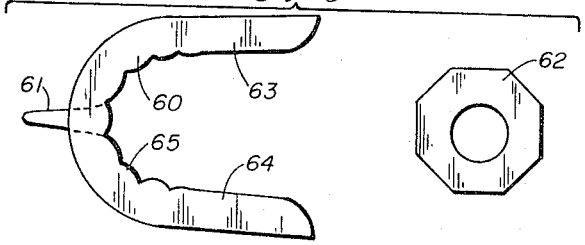
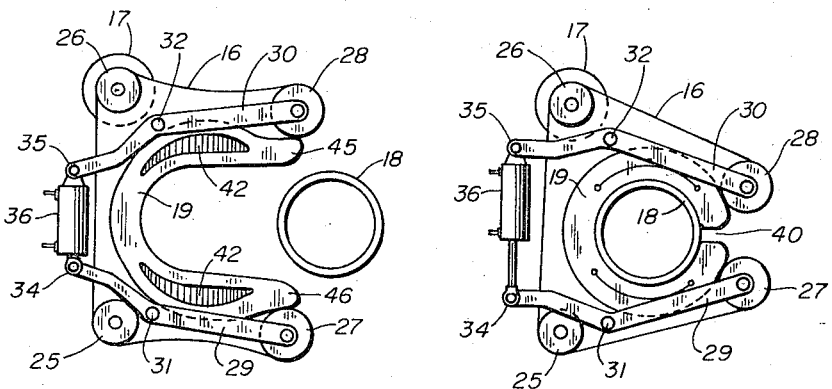
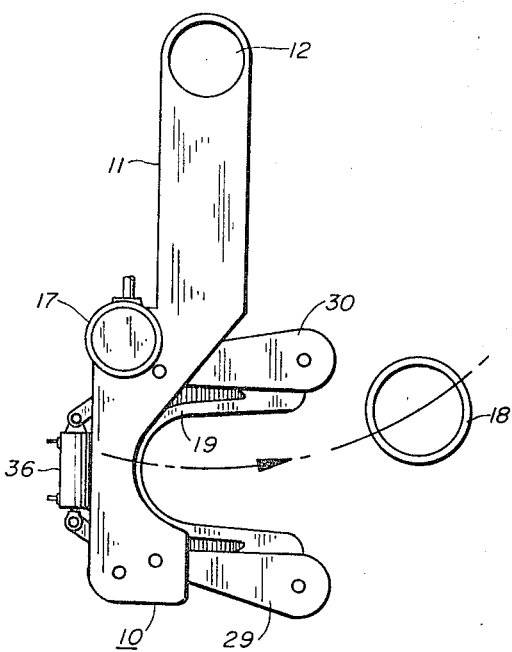
INVENTOR.
WILLIAM GUIER
BY
ATTORNEY United States Patent Office 3,308,691
Patented Mar. 14, 1967

3,308,691
CLUTCH BETWEEN A SOURCE OF POWER
AND A MEMBER TO BE ROTATED
William Guier, 3100 E. 71st St., Tulsa, Okla. 74105
Filed Sept. 29, 1965, Ser. No. 491,278
8 Claims. (Cl. 81—54)

The present invention is related to linking a source of power to a member which is to be rotated. More particularly, the invention is concerned with linking a powered endless chain to a surface of the member to be rotated.

Members have been rotated by powered endless chains which have captured the members within lengths of the chain. Power for the chains is available in several forms.

The gripping force of powered chains has had to be tremendous. The chain has had to grip the surface of the member directly with the principle of a friction clutch. The surface of the member has been damaged by this direct grip of the rough chain having the necessary force. Further, the direct contact has provided no shock absorption between the power and the member. Also, the chain has no provision for removing fluids from the surface of the member, and such fluids have provided lubrication between the chain and member which caused slippage in the direct, friction grip of the chain on the member. Finally, the chain length and its pivot points are necessarily fixed and therefore make a system inflexible to accommodate different diameters of members to be rotated.

The present invention has a principal object in providing a link between a powered endless chain and a member to be rotated which will positively clutch the two together.

Another object is to provide the link with an engaging surface which will militate against damage to the rotated member.

Another object is to provide the link with resilience which will absorb shocks of starting, stopping and changing speeds of the rotated member.

Another object is to provide the link with a body which will clean the member surface of potentially lubricating fluids.

Another object is to provide the link with adjustment in size to accommodate a wide range of diameters for the members.

Another object is to provide the link with a body which will permit a wide range of deviation of the axis of the member from vertical the plane in which the chain is moved.

The present invention contemplates the arrangement of an endless chain over a set of fixed and movable sprockets which will provide a path for the chain to be extended about a member to be rotated in capture of the member. A resilient body of material is placed within the path of capture of the chain so that the chain will be clutched to the member only through the body.

The resilient body, released by the chain capture, has a cross-sectional U-shape. The arms of this U-shaped body spring open to accommodate a member to be rotated or release such member after the desired rotation.

The U-shape of the resilient body lends itself readily to accommodation of inserts of generally similar shape within the arms of the U. The use of inserts of selected sizes enable the one chain to capture various members to be rotated having a selected range of cross-sectional areas.

The resilient body between the chain and rotated member maintains a large area of effective coupling contact between the chain and member even as the member is shifted in axial alignment over a finite range. The body is large enough and resilient enough to give and deform without loss of effective driving control between both chain and member. Some yield of the chain itself adds to the accommodation of the axial misalignment of the member.

Other objects, advantages and features of this invention will become more apparent to one skilled in the art upon consideration of the written specification, appended claims and the attached drawings, wherein:

FIG. 3 is a somewhat diagrammatic plan view of the essential structure of FIG. 1 positioned to receive a pipe for rotation;

FIG. 4 is similar to FIG. 3 with the structure in operative position to rotate the pipe;

FIG. 5 is a plan view of the structure of FIG. 1, showing how it is pivoted to an operative position to receive pipe for rotation;

FIG. 7 is a plan view of a link member with a form to accommodate members having other than round cross-sections.

Choice of embodiment of the invention

Figure 1:
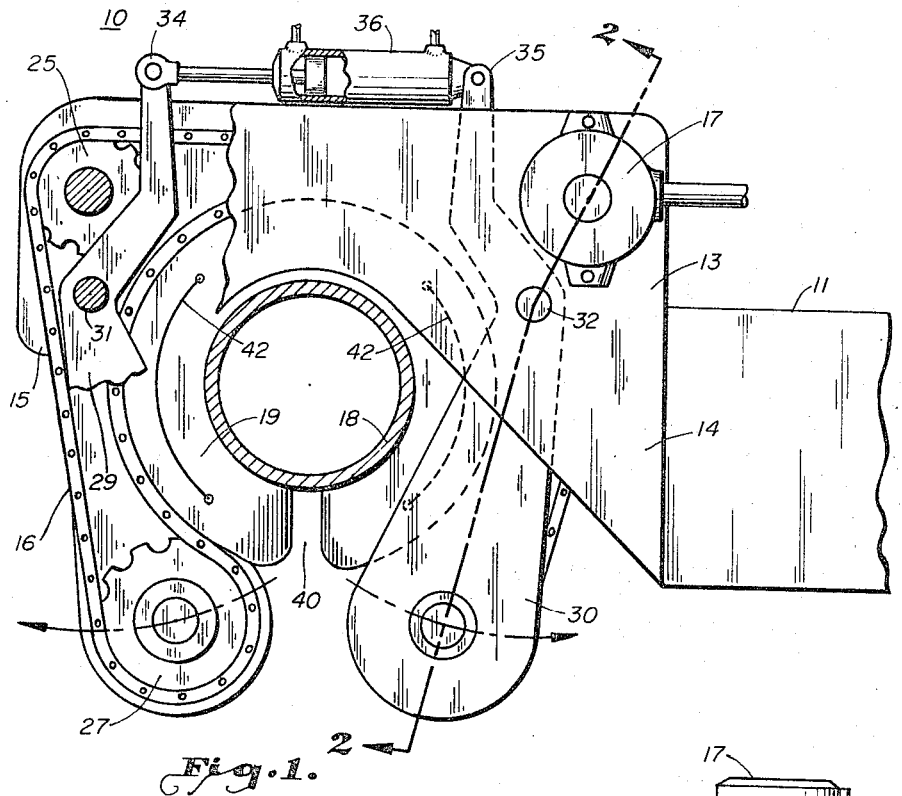
FIG. 1 is a partially sectioned plan view of an endless chain in a housing linked to pipe as a member to be rotated in a system embodying the present invention.

An immediate, practical need for the present invention is in the oil well drilling art. The basic system for movement of drill pipe in rotary drilling has had little change over its entire history. The guiding, stabbing, making and breaking joints; all of these operations have been carried out, essentially, by hand.

The procedure by which pipe is shifted from a rack, coupled to a like section of pipe in the well, and uncoupled and returned to the rack has required a dramatic cooperation by men working on the drill floor. The drama of the synchronized movements has been heightened by the danger of direct manual manipulation. The danger is clearly evidenced by the constant stream of injuries including loss of life.

The specific functions by the members of the drill crew which are dangerous may be tabulated as follows:

(1) The manual guiding of the pipe as the driller hoists the joint of pipe and the subsequent stabbing of the male end of the threaded joint (the pin end) into the female end (the box) of a pipe already being held by the slips in the rotary table over the well hole.

(2) Coiling the spinning chain, or rope, and synchronizing the positioning of this chain on the joint, and the subsequent holding of tension on the chain while the driller applies power to rotate the joint.

(3) Removing the joint of pipe as it is unscrewed and manually guiding it as the driller (the hoist man) lowers it to the floor after one or more men have negotiated it to a selected location on the floor.

All of the foregoing functions are performed with the hazard of unsure footing and many off-balance stances.

The hazards to life and limb are of primary importance, but it is obvious that much time can be saved if these functions can be automatically carried out by some form of powered equipment. Many inventors have proposed structures which they hoped would automate one or more of the functions outlined above. However, no generally acceptable solution to these problems has been produced.

The most noteworthy efforts to produce a structure for guiding and spinning pipes into and out of connection were made with the combined efforts of Humble Oil Company and Byron-Jackson Company. The structure produced was unsatisfactory for several reasons:

(1) The need for mechanically guiding pipe in make-up was not recognized.

(2) The spinning structure was incorporated in tongs and weight added to these already cumbersome means for tightening and breaking joints.

(3) The logic of combining structure with a stab guide was never developed.

The present invention has been embodied in a spinning head which is mounted on a pivoted arm so the head can be carried between a position over a well hole and a predetermined location adjacent the hole. The spinning head is illustrated in the drawings as comprising powered jaws which secure and release pipe over the well hole and location adjacent the hole.

The surface of an endless, powered chain forms the engaging surface of the jaws. Between the chain surface and the surface of the secured pipe is placed a flexible and resilient body to link the chain surface and pipe surface together for the powered rotation of the pipe.

The linking body is in the form of a split collar which returns to a U-shape when the jaws are open. This collar registers in the jaws to release and secure the pipe as an elongated member to be rotated. Additional insert collars of similar material are available to be readily placed within the first collar to accommodate pipe of different diameters.

General arrangement of spinning head

FIG. 1 is formed to disclose the essential elements of the pivoted spinning head in which the invention is embodied. The head 10, as a unit, is mounted on pivoted arm 11. FIG. 5 shows arm 11 to be pivoted at 12 to carry the head between two positions.

In FIG. 1, the case 13 is broken away to clearly disclose the working parts within the case which embody the invention. The case 13 is formed of, essentially, two parallel flat plates 14 and 15 which function to both enclose the moving parts and act as a frame to provide a base for pivot points of the moving parts.

The central part mounted within frame 13 is endless chain 16. This chain 16 is over a system of fixed and movable sprockets rotated at the pivot points, one of which sprockets is rotated by motor 17. Within the working length of chain 16 is a pipe 18. Between the surface of the chain and surface of the pipe a resilient body 19 is positioned to act as a positive link between the chain and pipe.

The more general operation of the spinning head 10 should be evident from FIG. 1. Two of the sprockets are pivoted to wrap a length of chain 16 about link body 19 and pipe 18 with a grip strong enough to positively drive the pipe in rotation. Motor 17 caused to turn and move chain 16 over its sprockets to rotate pipe 18 as desired.

The pipe surface is protected from damage by direct contact with the chain 16. The resiliency of the body 19 absorbs the shocks of sudden starts and stops by motor 17. The rubber-like nature of the material body 19 will squeeze the surface of the pipe 18 dry and secure a firm grip on it. The pipe 18 could be a large degree from the vertical and remain effectively gripped and rotated through the body 19.

Details of the spinning head

Figure 2:
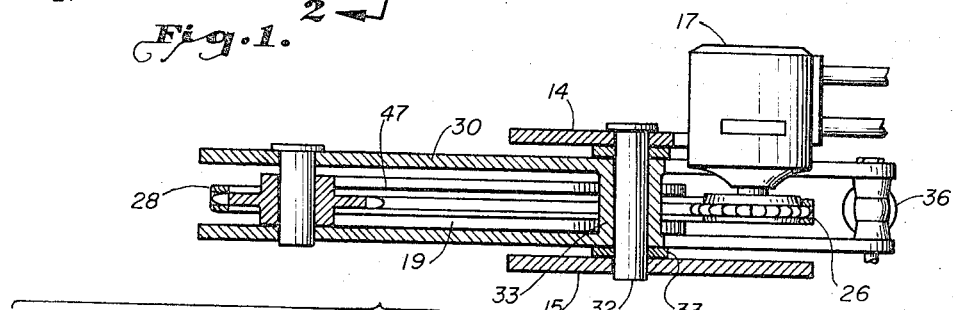
FIG. 2 is a sectioned elevation along line 2—2 in FIG. 1 showing the motor, chain and link in their operative positions.

The sprockets for chain 16 have been referred to. In FIGS. 1 and 2 sprocket 25 is shown mounted between plates 14 and 15 so as to rotate freely on a shaft. Sprocket 26 (FIG. 2) is also fixed at a location between the plates, but fixed on the drive shaft of motor 17 which is mounted on the upper plate 14.

From fixed sprockets 25 and 26, chain 16 is led over pivoted sprockets 27 and 28 (FIG. 2). Sprockets 27 and 28 are moved toward and away from each other, and with a finite length of chain 16 between them, become the jaws which grip the collar 19 and pipe 18 for rotating them.

To move sprockets 27 and 28 toward and away from each other, these sprockets are mounted on the ends of arms 29 and 30. These arms are each made up of two elongated plates which sandwich the sprockets 27 and 28 between them on one end.

The frame arms 29 and 30 are pivoted. Arm 29 is pivoted at 31 and arm 30 is pivoted at 32. FIG. 2 shows more clearly how these pivots for arms 29 and 30 are formed by pins extending between plates 14 and 15. In FIG. 2, pin 32 is shown journalled through plates 14 and 15, carrying a bushing 33 which spaces the plates of pivoted arm 30. Pivoted about pin 32, arm 30 carries sprocket 28 either toward or away from sprocket 27, mounted on similar pivoted arm 29.

Both pivoted, sprocket-bearing arms 29 and 30 are positioned from their ends 34 and 35. A hydraulic cylinder and piston 36 is attached to ends 34 and 35. The piston is shown attached to end 34 and the cylinder to end 35. As power fluid is applied to either side of the piston, the arms 29 and 30 are pivoted at 31 and 32. This pivoting causes the sprockets 27 and 28 to move, opening and closing these jaws. It may be desirable to have the jaws open more quickly from around collar 19 than they close around collar 19. Therefore, hydraulic fluid may be used on one side of the piston and air under pressure on the other side.

FIGS. 3 and 4 have been established to illustrate the more clearly how the jaws operate to grip and release pipe 18 through collar 19. Also, these drawings show in plan view how the collar conforms about pipe 18 and springs open as the jaws release. FIG. 4 shows, essentially, what FIG. 1 discloses with respect to how the jaws of arms 29 and 30, with chain 16, enfold and grip collar 19 about pipe 18. The piston of cylinder 36 is extended outward from the cylinder, moving pivot points 34 and 35 from each other. Rotation of the sprocket 26 by the shaft of motor 17 then moves the chain 16 over the other sprockets and pipe 18 is rotated as desired.

FIG. 3 illustrates how, after motor 17 has stopped so as to register gap 40 of collar 19 between sprockets 27 and 28, the opening of the jaws of arms 29 and 30 allow the arms of collar 19 to spring open and release pipe 18. When releasing pipe 18, collar 19 has the shape of a U form between whose arms the member to be rotated can be readily ejected by mechanical means or pulled out from between the arms by hand.

The basic operation of spinning head 10 can be completely understood from the foregoing description in connection with FIGS. 1, 2, 3, 4 and 5. Pivot arm 11 is moved about pivot point 12 with some form of power not shown. This power could be simply manual. In any event, arm 11 is pivoted at 12 to engage elongated members, as represented by pipe 18, for spinning into junction with another length of pipe, or uncouple such lengths of pipe.

As shown in FIG. 5, head 10 is either to be swung over to capture pipe 18 and carry this pipe to the position head 10 has in the drawing or pipe 18 has been released from head 10 by opening jaws 29 and 30 with power cylinder 36. In either event, this apparatus forms a unit which can be moved about pivot 12 with arm 11 to perform its functions.

Collar

The over-all operation of the spinner head has been discussed in some detail. However, the configuration and composition of collar 19 needs careful, individual consideration.

Figure 6:
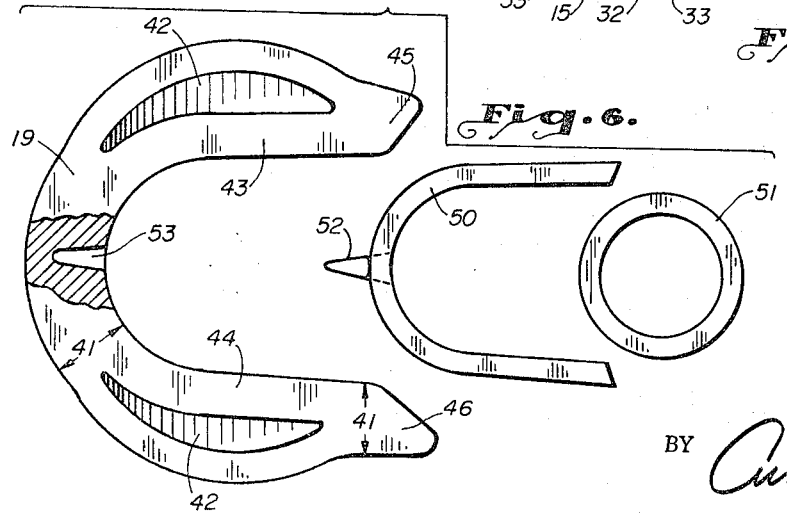
FIG. 6 is a plan view of the link member of FIG. 1 and an insert to accommodate a pipe smaller in diameter than the pipe of FIG. 1.

FIG. 6 shows collar 19 removed from the apparatus of spinner head 10. The U-shape is apparent, as in FIG. 3. However, in FIG. 6 the problem of wrapping this body about a generally cylindrical object can be discussed in several facets.

To begin, the plan view shows collar 19 to have a fairly thick dimension toward the center of the pipe it is to be wrapped about. This dimension is indicated as 41 and is so large that slits 42 are desired to be formed in the body of the collar, cut concentric with the pipe 18. These slits open out as shown in FIG. 6 to facilitate the arms 43, 44 springing open to form the U shape for receiving and discharging pipe. When the collar is then wrapped about the pipe 18, the slits close as shown in FIGS. 1 and 4 and the collar resembles a doughnut with the exception of a break at 40, between the ends of lips 43, 44.

Collar 19 can be made of any of several materials. The stresses and strains to which this link is subjected make for an extremely rugged service. Rubber compositions are an example of material which will provide the characteristics to stand up under the service and yet function to carry out the objects of the invention. However, there are other materials which will perform this duty under the concepts of the invention.

If the material is similar to rubber, it can be formed into longitudinal strips and laminated together by mechanical fasteners and/or adhesives. Additionally, spring steel may be included in the laminated construction; spring steel represents material which will open the arms 43 and 44 when jaws 29 and 30 release the collar arms.

The side of the collar engaged directly by chain 16 is preferably given a groove 45 (FIG. 2) in which the chain will fit and support the collar vertically between the gripped pipe and chain. When the jaws are open, the length of chain 16 between sprocket 27 and sprocket 29 will loosen. However, groove 45 will remain engaged with the chain when loosened and retain the collar from falling out of the open jaws and being misaligned before the next pipe to be rotated is received.

Collar insert

The dimensions of collar 19 are basically fixed for a certain size chain 16 and pipe diameter to be rotated. However, adaptation to smaller sizes is obtained by placing an insert within collar 19. When pipes of smaller diameter can be efficiently gripped by the jaws and rotated.

FIG. 6 shows an insert member 50 in exploded position with respect to collar 19. This insert 50 has the same general U-shape configuration and becomes a space-filling auxiliary to the link between the collar 19 and surface of a pipe 51 which was a diameter smaller than pipe 18.

Insert 50 is held in proper positional register with collar 19 by a tapered pin 52. This pin 52 fits into a receiving socket 53 located in the inner wall of collar 19 and this structure keeps the collar and insert moving as a unit as the jaws open and close about pipe 51.

Non-round rotated members

The reduction to practice illustrated has been confined to rotating elongated members of cylindrical cross-section. However, cross-sectional shapes other than cylindrical can be gripped and rotated by jaws utilizing collars under the concepts of this invention. FIG. 7 is offered as an example of such non-round member.

In FIG. 7, a collar insert 60 is shown with a pin 61 adapted to be placed within a collar 19. A non-round member 62 is indicated as insertable within the arms 63, 64 of collar 60.

It is not unreasonable to utilize insert 50 to this purpose. The smooth internal walls of collar insert 50 would grip the non-round walls of member 62 well enough to give a good degree of rotating torque under many circumstances. However, the internal walls 65 of insert 60 are shown in a ribbed form to illustrate how this surface can be given a specific form that will facilitate linking efficiently with the surface on non-round elongated members to be rotated by the invention.

Operation

Initially it was pointed out that the invention was reduced to practice in a spinning head for the drill pipe of oil wells. The head is mounted for selected positioning (FIG. 5) and not only rotates to make and unmake a string of drill pipe but accurately guides the pipe to the selected positions.

The jaws of the spinning head are actuated as remotely as desired by power fluid to cylinder 36. Of course, all of this movement of the spinning head and actuation of its jaws can be controlled from a console.

The actual rotation of the endless chain is controlled by energizing motor 17 in the desired direction and at the desired speed. This control can also be located at the console.

It becomes apparent that with the invention adding to the efficiency of the powered endless chain, the entire operation of drilling is improved. The number of personnel required is reduced and the work of the perosnnel required is made the more efficient and safe.

The efficiency of the collar 19, as a link, is evident from the foregoing disclosure. The collar is a shock absorber. It is a buffer between the harsh, raw chain surface and the surface of the rotated members. It squeezes fluid foreign matter from the surface of the rotated member so as to raise the amount of friction in the drive. Also, the collar is deformable enough to enable the rotated member to be vertically misaligned yet be effectively coupled to the source of power for rotation. With the collar as a part of the link from the motor 17 to the rotated member, the drive is dynamic, resilient and efficient. Finally, it is to be remembered that the principles centering around this collar are applicable in clutch duties other than the duty of the specific embodiment disclosed in the drawings.

In the cycle of operation there remains only the contemplation of how to regitser the gap 40 so that when the jaws of the head are opened the collar will open as shown in FIG. 3. There are various ways of detecting the location of this gap automatically. The motor 17 can be linked to these detectors so as to stop at the proper point in rotation as shown in FIG. 4. Also, the gap can be visually observed by personnel and motor 17 properly operated and stopped to orient this gap location. In connection with the present invention, this problem of registration is regarded as a relatively minor problem which can be solved in various ways.

Conclusion

Although the statement of the invention utilized the term "endless chain" which was disclosed in the drawings as embodied in structure 16, it is to be understood that this statement and structure are only representative of many flexible structures which can function as described. Perhaps the structure could be leather, wire rope, or some sort of belting material. In any event, the endless loop of material functions to capture the collar 19 and the member to be rotated by a finite length of the loop. The invention is not to be limited by the term "chain."

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. An apparatus for rotating a member, including,
a member to be rotated positioned at the location of rotation,
an endless chain having a finite length within which the member is captured,
a system of pivot points for the chain arranged to apply to surface of the finite length of the chain with predetermined force to develop friction between the chain surface and the member,
means mounted and linked to the chain to move the chain over the pivot points and rotate the member,
and a body of deformable and resilient material arranged between the surface of the member and the surface of the finite length of chain surface to mechanically link between the chain surface and member.

2. The apparatus of claim 1 in which means are provided to move selected pivot points to release the member from capture.

3. The apparatus of claim 2 in which the body assumes a U-shape when the pivot points release the member from capture.

4. The apparatus of claim 1 mounted on an arm which is actuated to pivot the apparatus between desired positions in the arc of pivot for the arm.

5. The apparatus of claim 1, including,
a pivoted arm,
one of the pivot points for the chain mounted on the first end of the arm,
and a hydraulic piston and cylinder attached to the second end of the arm for moving the chain length between its capture and release positions.

6. An apparatus for rotating the drill pipe and similar elongated members in an oil well, including,
an arm pivoted from a first of its two ends,
two sprockets mounted on the second end of the pivoted arm at fixed locations,
a motor mounted on the second end and geared to turn one of the two fixed sprockets,
two sprockets mounted on the second end of the pivoted arm on movable locations,
an endless chain mounted on the sprockets so as to provide a loop of the chain between the sprockets with the movable locations,
means attached to the movable sprockets to move them toward and away from each other and thereby capture elongated members with the length of chain between the sprockets,
and a body of deformable and resilient material between the chain and elongated member, the body shaped to provide a continuous link between the surface of the chain and the surface of the member rotated when the motor is actuated to move the endless chain over the sprockets.

7. The apparatus of claim 6 in which, the body assumes a U-shape when released by the movement of the sprockets away from each other.

8. The apparatus of claim 7 in which, the body is formed of strips of the material laminated with a metallic strip which will power the body to open into its U-shape when released.

References Cited by the Examiner

UNITED STATES PATENTS

| | | | |
|---|---|---|---|
| 2,523,159 | 9/1950 | Stone | 81—57 |
| 2,573,212 | 10/1951 | Martois | 81—57 |

WILLIAM FELDMAN, *Primary Examiner.*

JAMES L. JONES, Jr., *Examiner.*